United States Patent [19]

Kinkelaar

[11] Patent Number: 5,037,678

[45] Date of Patent: Aug. 6, 1991

[54] COATING COMPOSITION METHOD TO IMPROVE CORROSION RESISTANCE OF METAL WITH SOAP FILM-FORMING AND RESIN FILM FORMING COMPONENTS IN TEMPORARY DISPERSION

[75] Inventor: Edmund W. Kinkelaar, Dublin, Ohio

[73] Assignee: Texo Corporation, Cincinnati, Ohio

[21] Appl. No.: 420,137

[22] Filed: Oct. 11, 1989

[51] Int. Cl.$^5$ .............................. B05D 3/02; C04B 9/02
[52] U.S. Cl. ............................ 427/388.1; 427/388.4; 427/409; 427/417; 106/14.11; 106/14.14; 106/14.15; 106/14.22
[58] Field of Search ...................... 427/388.1, 409, 417, 427/388.4; 106/14.14, 14.15, 14.11, 14.22

[56] References Cited

U.S. PATENT DOCUMENTS

| | | | |
|---|---|---|---|
| 4,130,524 | 12/1978 | Boerwinkle et al. | 427/156 |
| 4,233,176 | 11/1980 | Conner, Sr. | 427/388.1 |
| 4,374,168 | 2/1983 | Wojtowicz | 427/409 |
| 4,737,385 | 4/1988 | Pekar et al. | 427/385.5 |
| 4,849,264 | 7/1989 | Pekar | 427/388.1 |
| 4,990,184 | 2/1991 | Dotson et al. | 106/14.15 |

Primary Examiner—Michael Lusignan
Assistant Examiner—Diana L. Dudash
Attorney, Agent, or Firm—Francis T. Kremblas, Jr.

[57] ABSTRACT

A coating composition and method of applying the coating to metal surfaces to improve corrosion resistance and substantially reduce coated parts from sticking to one another during the curing step is disclosed wherein a temporary dispersion of a di-phase mixture containing a resin film forming component and a soap film forming component are applied in a single coating step to a metal part. Upon curing the coated part, two distinct layers are formed wherein the resin film is adhered to the surface of the part and the soap film forming component is deposited uniformly over the resin film. During the curing step, the carrier agent portion of the soap film forming component is essentially volatized leaving only an upper layer of a soap film. The soap film is dry to the touch and forms an additional corrosion resistant barrier in cooperation with the underlying resin film.

13 Claims, No Drawings

COATING COMPOSITION METHOD TO IMPROVE CORROSION RESISTANCE OF METAL WITH SOAP FILM-FORMING AND RESIN FILM FORMING COMPONENTS IN TEMPORARY DISPERSION

FIELD OF THE INVENTION

The present invention relates generally to coating compositions and methods of applying the same. More particularly, the present invention relates to coating compositions and methods of applications to improve the corrosion resistance of metal surfaces and parts; and specifically to compositions and methods of application which impart two distinct layers of different components onto the part.

PRIOR ART

Many prior attempts have been made to improve the salt spray protection of metal parts and include various protective coatings or combinations of more than a single coating on a metal part. The preferred coatings of this type feature an oily surface coating layer or film which can be rubbed off onto one's hand. One example of useful applications for such protective coatings can be found in the automotive industry where metal fasteners require a protective coating to resist corrosion and must meet automotive salt spray standards set by the particular company.

In some applications, a paint coat and an additional oil coat over the paint coat are required to meet the salt spray standard test specifications.

U.S. Pat. No. 4,737,385 discloses a composition and method whereby a single application of a coating of noncoupled temporary dispersion of a resin film forming paint and an oil component on a part advantageously result in providing both a paint film layer and a distinct oil layer overlying the paint film. Significantly improved corrosion resistance is disclosed therein along with the economical advantage of eliminating the plural separate coating steps conventionally employed prior to the invention disclosed in this patent.

However, while excellent corrosion resistance is provided to the metal part employing the method disclosed in this patent, the overlying oil coat is objectionable in some applications due to its "oily feel" or to the residue of the oil coat which is left on the hands of one touching the coated part.

While merely supplying a single coat of paint offers a degree of corrosion resistance without the oil overcoat and is dry to the touch, the corrosion resistance is not wholly satisfactory even for the less harsh environment found in applications such as the interior of vehicles. This is due in part to having only a single paint film barrier and to the defects which occur in said paint film coating which typically happen during the curing step of batch commercial painting processes for these type of parts. The adherence or sticking together of adjacent parts in the batch leads to chipping or breaking off of portions of the paint coat when such parts must be physically separated from one another after the curing step. These uncoated areas or spots are highly susceptible to corrosion and lead to unacceptably high corrosion rates.

Other coating compositions and methods of application for improving salt spray corrosion resistance are found in U.S. Pat. Nos. 4,440,582 and 4,748,055 in addition to the patent referred to above and in some of the prior art references cited in these patents.

BRIEF DESCRIPTION OF INVENTION

The present invention relates to a novel and improved coating composition and method of applying the same to provide corrosion resistance to metal parts. In particular the present invention relates to an improved coating composition and method which provides two distinct and different film layers. One layer comprises a resin film adhered to the surface of the part and the second layer is a dry to the touch, soap film distributed over the resin film.

In a manner similar to that disclosed in U.S. Pat. No. 4,737,385, it is important that these two components comprise separate phases and are not coupled in solution or in a stable emulsion when mixed together. As used herein, the terms uncoupled or not coupled mean that the two components are insoluble in one another and other agents are not employed which would be sufficient to form a stable emulsion of the mixture of the components. Upon mixing these two components to form a temporary dispersion and applying a single coating of the mixture on a metal part, the soap forming component will separate from the resin film forming component during the curing step of the coating process. Upon curing, the resin film adheres to the surface of the part in a distinct and separate layer while the soap film forming component forms an overlying and distinct layer.

However, unlike the overlying oil layer in the process disclosed in U.S. Pat. No. 4,737,385, the soap film forming component includes a carrier agent which is substantially volatilized during the curing step to leave only a dry to the touch soap film overlying the resin film. The resulting resin film and soap film layers formed on the part exhibit more than satisfactory salt spray performance, yet the overlying soap film barrier is non-oily and dry to the touch.

Further, this combination of components applied as described herein substantially eliminates the sticking of the parts to one another during the typical commercial batch curing step and therefore eliminates or effectively reduces the spot losses of the resin film which occurs in conventional painting processes as described before herein. The soap film forming component overlying the resin film component functions as a very effective parting agent to eliminate the adherence of coated parts to one another during the curing step even though the carrier agent portion of the soap film component is being volatilized during the curing step.

The novel composition of the present invention includes a resin film forming component, such as a conventional water based paint composition, into which a soap film forming component is mixed to form a temporary suspension of the two components. Such conventional paints include epoxy esters, alkyd melamines, melamines, acrylics, polyesters and baking enamels.

Suitable preferred carrier agents included in the soap film forming component can be one or a mixture of hydrotreated naphthenic distillate type mineral oils.

Soap forming agents include fatty acids such as one or a mixture of palmitic, stearic, oleic, linoleic. However, carboxylic acids may also be expected to form soaps usable in the context of the present invention.

The soap formed in accordance with the present invention should be anionic and alkaline in character. Therefore the soap forming component includes a nonionic alkaline agent capable of reacting with the organic acid to form soap. Amine soaps work well and are believed to enhance corrosion resistance in accordance with the present invention and are soluble in the carrier agent.

Preferred neutralizing agents for reaction with fatty acid include amines within the molecular weight range of about 105 to 191 grams per mole or mixtures thereof.

Additionally an anionic detergent or wetting agent is employed in the soap film forming component and is soluble in both oil and water. The wetting agent aids the formation of a uniform, yet temporary dispersion to be formed between the resin film forming and the soap film forming components particularly when the carrier agent is a hydrotreated naphthenic distillate oil or an equivalent carrier agent having a relatively higher vapor pressure and lower boiling points compared to the typical "phosphating oils" disclosed in the prior art patents referred to earlier herein.

OBJECTS

It is an object of the present invention to provide a novel composition and method for improving the corrosion resistance of metal parts which results in an underlying resin film layer and an overlying, dry to the touch, soap film layer.

It is another object of the present invention to provide the composition and method described above which permits application of a single coating mixture of a temporary dispersion of a resin film forming component and a soap film forming component to form the resulting two distinct layers on the coated part in an economical manner.

It is another object of the present invention to provide a composition and method of application as described which eliminates or dramatically reduces the tendency of metal parts to stick to one another during the coating and curing step and thereby eliminate the necessity for a second application of an additional protective coat in a second coating step to cover spot losses of the coat upon physical separation of the parts adhered to one another.

It is a further object to provide a composition and method of application as described wherein the soap film layer overlying the resin film layer also provides an additional barrier to corrosion of the part yet leaves no oily residue on the part and is dry to the touch.

DETAILED DESCRIPTION

In accordance with the present invention, the novel composition includes a resin film forming component and a soap film forming component which is not coupled into the resin film forming component to form a solution or stable emulsion therewith. Preferred resin film formers useful in the present invention include those typical conventional water based paint formulations used to apply paint coats to metal parts for corrosion resistance.

The soap film forming component comprises a liquid organic carrier agent, an organic acid and an organic, anionic alkaline agent capable of reacting with an organic acid to form a soap. The carrier agent functions to provide a solute in which the organic acid and anionic alkaline agent may be dissolved. However it is not coupled into solution or stable emulsion with the resin film forming composition. The resin film forming component and soap film forming component may then be mixed together to form a homogenous, yet temporary dispersion of the two components. This characteristic is important for reasons similar to those described in U.S. Pat. No. 4,737,385 to permit a single coat of the temporary dispersion of the two components to be applied in a uniform manner, yet each component separates during the curing step to form two separate and distinct layers on the coated part.

However, unlike this prior coating composition, the carrier agent in accordance with the present invention is volatized during the curing step so that a dry to the touch protective soap film is deposited over the separate resin film instead of an oily layer.

Therefore, the carrier agent for the soap forming component must have certain characteristics in addition to being uncoupled in the resin film former. It should vaporize at a rate which is compatible to a temperature range and time reasonably practical for commercial coating applications typically employed in curing the resin film forming component. It also must be soluble with the soap forming agents.

Suitable carrier agents are those saturated or unsaturated straight chain hydrocarbons which are solvents for the agents which react to form a soap useful in accordance with the present invention. The carrier agent provides a solvent vehicle for the soap reactants and is incompatible with the resin film former vehicle so as not to be coupled therein upon mixing. The carrier and soap formed may then separate from the resin film former after application of a coating of this mixture to form the two distinct film layers as described herein.

The most preferred carrier agents have a vapor pressure which is reasonably compatible with the temperature and time period typically employed in the paint curing steps of conventional commercial coating applications so that the carrier agent may be substantially volatized to leave primarily a soap film overlying the cured resin film.

Typical commercial coating applications for metal fasteners, for example, desirably employ a curing step at temperatures between about 200 to 250 degrees F for a time ranging between about 5 to 20 minutes and preferably about 10 minutes. A commonly used temperature is about 225 degrees F. Hydrotreated naphthenic distillate mineral oils have been found to substantially vaporize within these parameters and effectively provide desirable results in accordance with the present invention.

Those compatible hydrocarbons which have higher vapor pressures and lower boiling points than the preferred agents described herein may be expected to be operable as carrier agents but may be less desirable for practical or economic reasons for some commercial applications. Those hydrocarbons which have lower vapor pressures and higher boiling points than the disclosed preferred carrier agents will require higher curing temperature and longer curing times to become substantially vaporized.

The carrier agent is at least substantially vaporized during the curing step in accordance with the present invention. However, it is believed desirable that a small residue of the carrier agent, remain in solution with the soap film formed to enhance the corrosion resistance of the soap film layer, yet not in any amount which detracts from the intended non-oily or dry to the touch characteristic of the film. Included in the preferred group of carrier agents are castor oil, tung oil, linseed oil and other paraffinic oils having the appropriate characteristics mentioned above.

The preferred soap forming components include fatty acids and organic neutralization agents which saponify the fatty acids to form a soap. Examples of suitable fatty acids include palmitic, stearic, oleic and linoleic. Preferred neutralization agents include amines within the molecular weight range of about 105 to 191 grams per mole and mixtures thereof. These include diethanolamine, triethanolamine, mono-isopropanolamine, di-isopropanolamine and tri-isopropranlamine and mixtures thereof.

Other organic acids and neutralizing amine combinations would be expected to operably function in accordance to the present invention. Particularly with respect to fatty acids and other long chain organic acids, the higher molecular weight fatty acids would tend to form a harder soap film while those of lower molecular weight tend to form a softer film layer which is believed to be more desirable for the purposes of the present invention.

Resin film formers useful in the present invention include those water based paint compositions typically used to coat metal fasteners in the automobile industry. A preferred paint composition is one commercially available from Saran Corporation and sold under the tradename SARAN BWP 9012. While a pigment containing paint composition is desirable for many applications, a clear paint is quite suitable for the general purposes of the present invention.

Any anionic wetting agent or detergent which is sufficiently soluble in oil and water and compatible with the purposes of the present invention would be expected to be operable to aid the disperability of the two phases in one another. A preferring dispersing aid is a blend of a metal petroleum sulfonate and glycol. Other compatible agents include nonylphenoxy ethylene oxide ethanols, octylphenoxy ethyleneoxide ethanols, and ethyleneoxide block polymers, for example, as long as these agents are sufficiently soluble in both oil and water.

Such agents reduce surface tension to a degree to permit the resin film former and soap film forming components to be uniformly dispersed within one another to form a temporary dispersion as defined herein. However, they are used in amounts which fall short of forming a stable emulsion of the mixture of the resin film and soap film forming components. Satisfactory uniformity of the dispersion is important to assure that a uniform film of each component is formed on the coated part upon separation of the components during the curing step.

It has also been found that adjusting the pH of the mixture is beneficial to control the length of time the temporary dispersion remains uniform upon standing and provides practical advantages in commercial coating applications of the mixture while still permitting the necessary separation of the two phases during the curing step. Preferably, for example, adjusting the pH of the mixture to between about 8.2 and 9.6 enables the temporary dispersion of the two component mixture in accordance of the present invention to remain in a uniformly dispersed form during an eight hour work shift for example, without requiring relatively frequent mixing. Too low a pH results in relatively rapid separation of the di-phase mixture and requires frequent mixing in order to maintain a uniform dispersion of the mixture.

Higher pH values of the dispersed mixture retard separation. However, too high a pH value will couple the mixture of the resin film former and soap film former and form a single phase which foreclose the separation of the two components during the curing step. This nullifies the advantages obtained in accordance with the present invention. Current tests indicate that a preferred range of pH values of the preferred mixture described in the examples appear to be between about 8.6 to 9.2 which appear to maintain the coating mixture in a uniformly dispersed state for about 8 to 16 hours.

Strongly alkaline amines work well as pH adjusting agents in the context of the present invention. A preferred amine is 1-amino-2 methylpropanol. These agents may be initially added during the dilution of the concentrated mixture with water and may be periodically added to the coating bath of the mixture during commercial coating operations to counteract the effect of acid residues remaining on the phosphated parts being coated to re-adjust the pH to the desired value as may be necessary. However, such pH adjusting agents must be compatible with the constituents in both the resin film forming composition and the soap film former relative to their function and purpose in accordance with the present invention.

The combined resin film former and soap film former component mixture may be prepared in concentrated form and later diluted with water. De-ionized water is preferred to reduce the initial viscosity of the concentrated mixture to the desired level. One must be sure not to add too much water in order to avoid coupling of the mixture of the resin film forming component and the soap film forming component. As indicated earlier herein if the mixture of these two components is coupled into solution or into a stable emulsion, then separation will not occur during the curing step and the advantageous results of the present invention will not be realized. It has been found that water up to about 30 percent by volume of the total mixture of both components can be employed and still avoid coupling of the two components to one another to form a single phase rather than di-phase temporary dispersion.

The addition of a wetting agent or detergent to the soap film forming component in order to aid the formation of a uniform dispersion of the two phase mixture between the resin film former and the soap film former is recommended particularly when the lighter naphthenic distillate oils or their equivalents are employed as the carrier agent. A blend of sodium petroleum sulfonate and a glycol is one of the preferred wetting or dispersion aiding agents and works well in the present invention. The preferred glycols blended with the sodium petroleum sulfonate may be one from the group including ethylene glycol, diethylene glycol, triethylene glycol, tetraethylene glycol, propylene glycol, dipropylene glycol, tri-propylene glycol, 1,3 butylene glycol, hexylene glycol and mixtures thereof. The ratio of the sodium petroleum sulfonate to the glycol in a blend thereof should be within the range of about 20:1 to 40:1. The preferred range is within about 24:1 to 34:1. A concentration of the wetting agent in the soap film forming component within the range of about 5 to 15 percent by weight is recommended. The preferred range is between 9 to 11 percent by weight. Examples of commercially available wetting agent blends which work well in accordance with the present invention include those sold by Emery Corporation under the brand name "TWITCHELL BASE" and by Witco Corporation under the brand name "PETROMIX".

A preferred soap film forming component for use in the present invention is sold commercially by Texo Corporation under the brand name "TEXO LP 1528" and includes a suitable naphthenic mineral oil carrying agent, a blend of fatty acids, a neutralizing agent, and a wetting or dispersion aiding agent in a formulation within the guidelines described herein.

A resin film forming and soap film forming composition in accordance with the present invention may be mixed to form a homogenous temporary suspension of the two components. The temporary suspension, as contemplated herein will separate to form two, easily visible, separate phases upon standing in ambient conditions in less than 24 hours. Preferably, the temporary dispersion will remain relatively uniform for about 8 to 16 hours which corresponds to one or two shifts under typical commercial conditions. The pH of the mixture may be adjusted accordingly as described earlier herein to accommodate the conditions desired by the user.

The coating composition of the present invention as prepared for use include 50 to 70 percent by volume of the resin film forming component, 5 to 15 percent by volume of the soap film forming component and about 20 to 30 percent by volume of water. Water is added to dilute a concentrated mixture of the two components, to adjust the viscosity according to the particular application. As referred to earlier herein, adding an amount of water greater than about 30 percent by volume of the total composition is limited to such greater amount which is sufficient to couple the resin film forming and soap film forming component together to form a stable single phase which is to be avoided. Good results in accordance with the present invention have been obtained in tests when the viscosity of the mixture is between 25 seconds to 62 seconds No. 2 Zahn Cup. The desired viscosity of the mixture depends upon the thickness of the coating desired and the practical economic limits of commercial applications. The mixture should be of a viscosity that is relatively easy to apply and yet a single coating thereof should provide the distinct film layers of each component on the part sufficient to obtain the protection level desired.

The composition of the present invention may be applied using the conventional techniques of coating articles including dip spinning, brushing and other well-known methods.

For best results, the parts to be coated should first be prepared in accordance with the well-known and conventional cleaning and phosphating steps typically employed in the industry for improving salt spray corrosion resistance standards.

During application of the composition of the present invention, conventionally accepted painting practices should be followed.

Metal parts, such as fasteners, treated with the novel composition in accordance with the present invention have shown excellent corrosion resistance relative to industry standard salt spray tests and yet eliminate the "oily" surface present using other priorly known methods of improving corrosion resistance.

Salt spray tests in accordance with ASTM Method B117 indicate that parts coated in accordance with the present invention have passed 480 hours exposure to the salt spray atmosphere. This is twice as great as the minimum standard exposure of 240 hours set for some major automobile companies.

As indicated above herein, the resin film forming and soap film forming components are mixed to form a homogenous temporary suspension and applied in a similar manner as disclosed in U.S. Pat. No. 4,737,385.

However, during the curing step when the coated parts are baked for 10 minutes at 225 degrees F for example, the carrier agent in the soap film forming component is substantially volatized leaving a soap film uniformly distributed over the underlying cured resin film which has adhered to the surface of the part.

This soap film formed on the parts processed in the Examples described herein were dry to the touch and no "ruboff" or oily feeling was noted as compared to the prior corrosion resistant oil coatings used to improve corrosion resistance.

It appears that upon application of the temporary suspension of the composition of the present invention, the resin film forming component, separates from the soap film forming phase by sinking to the surface of the part. The soap film forming phase migrates to the surface where the carrier agent is substantially volatized during the curing step to leave the soap reaction product distributed as a thin film in overlying relationship to the resin film.

In addition to providing another vapor barrier to inhibit corrosion in the form of a soap film, the soap film forming component further acts as a parting agent in the sense that it essentially eliminates the sticking together of the coated parts which typically occurs in conventional batch painting methods of metal parts.

In this manner, the present invention provides a similar advantage to that disclosed in U.S. Pat. No. 4,737,385 with the added advantages of a non-oily and dry to the touch finish on the part.

In preparing coating compositions in accordance with the present invention, a concentrate may be first formed employing about 80 to 95 percent of the resin film forming component and about 5 to 20 percent of the soap film forming component, the percent being an a volume basis. The preferred ranges are about 85 to 90 percent and 10 to 15 percent of the respective components. Water is then added to obtain the desired viscosity. While increasing the amount of the soap film forming component to a greater percentage may be expected to increase the salt spray performance, such higher percentages do not appear to be of economical practicability since compositions according to the following examples have substantially exceeded the minimum 240 hours of exposure to salt spray test currently required by major automobile companies.

EXAMPLE I

A number of steel fastener parts were conventionally prepared by cleaning, alkaline descale, pickled and phosphated in an essentially identical manner as used in well-known conventional prior art phosphating processes.

After a rinse and sealing step, the parts were dried at 220 degrees F (temperature of the part) for 5 to 10 minutes to remove surface water.

The parts were then cooled to ambient room temperature and immersed in a coating composition according to the present invention as described below and subjected to a dip spin step for five seconds in each direction. The viscosity of the coating composition was adjusted by adding de-ionized water to a concentrated mixture of the composition to obtain a viscosity of about 61 seconds No. 2 Zahn Cup at an ambient room temperature (about 75 degrees F). The pH of the coating composition was adjusted by the addition of 1-amino-2 methylpropanol to between 8.8 to 9.2.

After the dip spin immersion step, the parts were baked at 225 degrees F for 10 minutes. The parts exhibited a paint film layer adhered to the surface of the part and a distinct soap film layer over the paint film and had a non-oily, dry to the touch feel.

The resin film forming component used was a conventional water based black paint composition sold by Saran Protective Coating Company under the trade name SARAN BWP 9012. The soap film forming component was a commercially available solution containing a hydrotreated naphthenic distillate mineral oil, a fatty acid blend, an amine neutralizing agent, and a wetting agent. Such composition is commercially available from Texo Corporation under the trade name TEXO LP 1528 and sold for oil rust preventative coating applications.

The coating composition of the present invention was formed using a mixture comprising 87.5 percent by volume of the black paint and 12.5 percent by volume of TEXO LP 1528. De-ionized water was added to this concentrated form sufficient to reduce the viscosity as noted above.

The coating bath of this composition was prepared by thoroughly stirring the mixture to form a substantially homogenous temporary dispersion of the two components. The coated parts were then subjected to a salt spray atmosphere in accordance with ASTM Method B 117. All the parts successfully passed 384 hours of exposure wherein failure is judged upon a showing of greater than 3 percent visible red rust on the surface area of a part.

EXAMPLE II

A set of five metal fasteners were prepared in the same manner as described in Example I and coated with a composition formed employing the same steps as described in Example I. The only difference was that the mixture of the paint resin film forming component and TEXO LP 1528 soap film forming component were reduced with water to a 25 sec viscosity No. 2 Zahn Cup. The parts were air dried for 10 minutes and then baked for 10 minutes at 225 degrees F. None of the parts showed failure after 480 hours of exposure to the same salt spray tests described in Example I. The parts also exhibit the non-oily, dry to the touch feel as the parts in Example I.

EXAMPLE III

Example I was repeated except the coating composition consisted of 90 percent by volume of the black paint and 10 percent by volume of TEXO LP 1528. Water was added to reduce the viscosity to No. 2 Zahn Cup and the pH of the mixture was adjusted in the same manner as in Example I to a value of 8.27. All of the coated parts passed 384 hours of the same salt spray test used in the above described examples and the same dry to the touch feel.

EXAMPLE IV

Example III was repeated with the exception that the pH of the mixture of the coating composition was adjusted to 8.62. All coated parts exhibited the non-oily, dry feel and were tested under the same salt spray exposure conditions as in the above examples for 240 hours and satisfactorily passed the test.

While certain preferred embodiments of the present invention have been disclosed in detail, it is to be understood that various modifications may be adopted without departing from the spirit of the invention or scope of the following claims.

What is claimed is:

1. A coating composition for improving corrosion resistance of metal surfaces comprising, in combination, a mixture forming a temporary dispersion of;
   (a) a soap film forming component including
      (1) an organic liquid carrier agent;
      (2) an organic acid and an organic, anionic saponifying agent which reacts with said acid to form a soap, said acid and said saponifying agent being soluble in said carrier agent;
   (b) a resin film forming component which is insoluble in said soap film forming component, the amount of said resin film forming components being greater than the amount of said soap film forming component on a volume basis; and
   (c) water in an amount insufficient to cause said soap film forming component and said resin film forming component to become coupled to form a solution or stable emulsion.

2. The composition defined in claim 1 wherein said carrier agent is a saturated or unsaturated straight chain hydrocarbon.

3. The composition defined in claim 1 wherein said carrier agent is a hydrotreated naphthenic distillate type mineral oil.

4. The composition defined in claim 1 wherein said carrier agent is one or a mixture of a castor oil, tung oil, linseed oil, mineral oil.

5. The composition defined in claim 1 wherein said carrier agent is a paraffinic oil.

6. The composition defined in claim 1 wherein said organic acid is a fatty acid selected from the group consisting of palmitic, stearic, oleic and linoleic or mixtures thereof.

7. The composition defined in claim 1 wherein said saponifying agent is a anionic and alkaline.

8. The composition defined in claim 1 wherein said organic saponifying agent is an amine or mixture of amines within the molecular weight range of about 105 to 191 grams per mole.

9. The composition in claim 1 wherein about 70 percent of said carrier agent in a single coating layer of said composition will substantially vaporize upon exposure to a temperature between 175 to 250 F degrees in at least about twenty minutes.

10. The composition defined in claim 1 wherein having a pH of between about 8.2 to 9.6.

11. The composition defined in claim 1 which comprises:
   (a) from about 3 to 15 percent, by volume, of the soap film forming component;
   (b) from about 50 to 70 percent, by volume, of the resin film forming component; and
   (c) from about 20 to 30 percent, by volume, of water.

12. A method of coating a metal surface to improve corrosion resistance comprising the steps of:
   (a) applying a single coat of a mixture having a composition defined in any one of the claims 1–11 to a metal surface;
   (b) heating said coated metal surface to cure said resin film and substantially volatize said carrier agent to form two layers on said metal surface with a layer of resin film adhered to the surface of said metal part and a substantially soap film layer uniformly distributed in overlying relationship to said resin film layer.

13. A formed metal object coated with the corrosion resistant composition defined in claim 1.

* * * * *